US010177432B2

(12) United States Patent
Hensarling et al.

(10) Patent No.: US 10,177,432 B2
(45) Date of Patent: Jan. 8, 2019

(54) FLEXIBLE ANTENNA ASSEMBLY FOR WELL LOGGING TOOLS

(71) Applicant: Halliburton Energy Services, Inc., Houston, TX (US)

(72) Inventors: Jesse Kevin Hensarling, Cleveland, TX (US); Mark Anthony Sitka, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 107 days.

(21) Appl. No.: 15/024,693

(22) PCT Filed: Dec. 6, 2013

(86) PCT No.: PCT/US2013/073735

§ 371 (c)(1),
(2) Date: Mar. 24, 2016

(87) PCT Pub. No.: WO2015/084411

PCT Pub. Date: Jun. 11, 2015

(65) Prior Publication Data

US 2016/0248143 A1 Aug. 25, 2016

(51) Int. Cl.
*H01Q 1/04* (2006.01)
*G01V 3/30* (2006.01)
(Continued)

(52) U.S. Cl.
CPC ......... *H01Q 1/04* (2013.01); *E21B 47/02216* (2013.01); *E21B 49/00* (2013.01);
(Continued)

(58) Field of Classification Search
CPC .......... H01Q 1/04; H01Q 1/085; H01Q 21/29; H01Q 11/08
See application file for complete search history.

(56) References Cited

U.S. PATENT DOCUMENTS 5,530,358 A 6/1996 Wisler et al.
2003/0184303 A1 10/2003 Homan et al.
(Continued)

OTHER PUBLICATIONS

International Search Report, dated Sep. 4, 2014, PCT/US2013/073735, 3 pages, ISA/KR.
(Continued)

*Primary Examiner* — Graham Smith
(74) *Attorney, Agent, or Firm* — Haynes and Boone, LLP

(57) ABSTRACT

A disclosed example embodiment includes an antenna assembly for use in a well logging system. The antenna assembly includes a flexible, non-conductive cylindrical core having an outer surface and an electrically conductive path positioned on the outer surface of the core. The electrically conductive path forms an electromagnetic coil operable to transmit or receive electromagnetic energy. The electrically conductive path is formed on the core without winding a wire around the core using, for example, a removal process selected from the group consisting of milling, machining, etching and laser removal, an additive process selected from the group consisting of printing with conductive and dielectric inks and silk screening with conductive and dielectric epoxies or an integrated material deposition process such as a multi-material 3D printing process. The antenna assembly may be flexible mounted on a tubular member during assembly of a well logging tool.

18 Claims, 5 Drawing Sheets

(51) Int. Cl.

| | |
|---|---|
| ***E21B 47/022*** | (2012.01) |
| ***E21B 49/00*** | (2006.01) |
| ***H01Q 1/08*** | (2006.01) |
| ***H01Q 21/29*** | (2006.01) |
| *E21B 47/18* | (2012.01) |
| *H01Q 11/08* | (2006.01) |

(52) U.S. Cl.

CPC ............... *G01V 3/30* (2013.01); *H01Q 1/085* (2013.01); *H01Q 21/29* (2013.01); *E21B 47/18* (2013.01); *H01Q 11/08* (2013.01)

(56) References Cited

U.S. PATENT DOCUMENTS

| | | | | |
|---|---|---|---|---|
| 2008/0030415 | A1* | 2/2008 | Homan .................... | H01Q 1/04<br>343/719 |
| 2009/0072825 | A1 | 3/2009 | Prammer et al. | |
| 2012/0105076 | A1 | 5/2012 | Li et al. | |
| 2013/0127684 | A1 | 5/2013 | Li et al. | |

OTHER PUBLICATIONS

Office Action issued for Canadian Patent Application No. 2,925,477, dated Oct. 30, 2017, 4 pages.

Office Action, issued by the Chinese State Intellectual Property Office, dated Jul. 16, 2018, Application No. 2013800799357, 4 pgs.

Official Action, issued by the Mexican Patent Office, dated Jul. 24, 2018, Application No. MX/a/2016/004007, 3 pgs.

* cited by examiner

FLEXIBLE ANTENNA ASSEMBLY FOR WELL LOGGING TOOLS

The present application is a U.S. National Stage patent application of International Patent Application No. PCT/US2013/073735, filed on Dec. 6, 2013, the benefit of which is claimed and the disclosure of which is incorporated herein by reference in its entirety.

TECHNICAL FIELD OF THE DISCLOSURE

This disclosure relates, in general, to equipment utilized in conjunction with operations performed in relation to subterranean wells and, in particular, to a flexible antenna assembly operable for use in a subterranean well logging system.

BACKGROUND

Modern petroleum drilling and production operations demand a great quantity of information relating to the parameters and conditions downhole. Such information typically includes the location and orientation of the wellbore and drilling assembly, earth formation properties and drilling environment parameters downhole. The collection of information relating to formation properties and conditions downhole is commonly referred to as logging. For example, a well can be logged after it has been drilled, such as by using wireline systems and methods. A well can also be logged during the drilling process, such as by using measurement while drilling (MWD) and logging while drilling (LWD) systems and methods.

Various measurement tools may be used during a logging operation. One such tool is the resistivity tool, which includes one or more antennas for transmitting an electromagnetic signal into the formation and one or more antennas for receiving a formation response. When operated at low frequencies, the resistivity tool may be called an induction tool and at high frequencies, it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of the receive signals are compared to each other to measure the formation resistivity.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1:
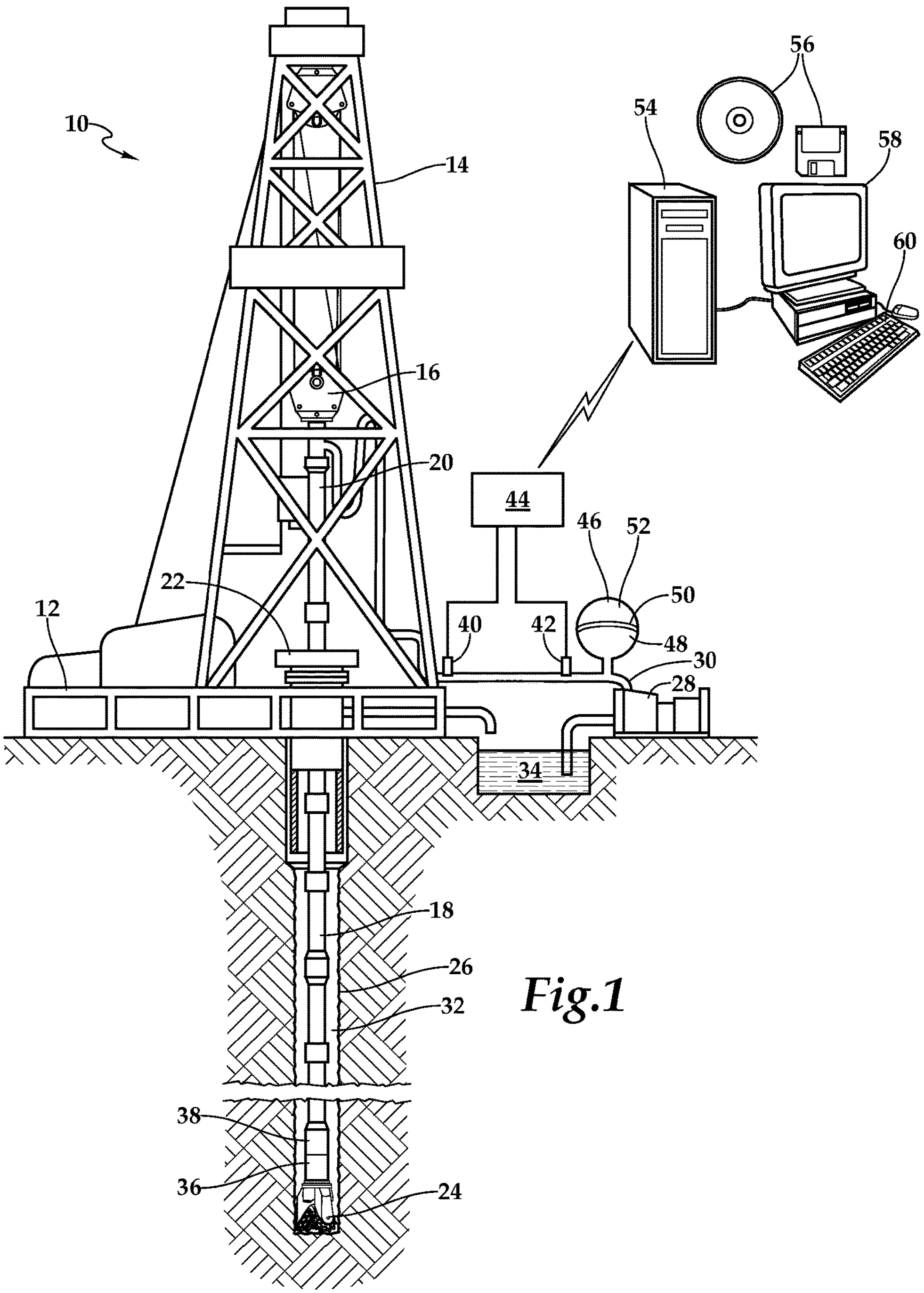
FIG. 1 is a schematic illustration of a well system during a drilling operation using a well logging tool having a flexible antenna assembly according to an embodiment of the present disclosure.

While various system, method and other embodiments are discussed in detail below, it should be appreciated that the present disclosure provides many applicable inventive concepts, which can be embodied in a wide variety of specific contexts. The specific embodiments discussed herein are merely illustrative, and do not delimit the scope of the present disclosure.

In a first aspect, the present disclosure is directed to an antenna assembly. The antenna assembly includes a flexible, non-conductive cylindrical core having an outer surface and an electrically conductive path positioned on the outer surface of the core. The electrically conductive path forms an electromagnetic coil operable to transmit or receive electromagnetic energy. The electrically conductive path is formed on the core without winding a wire around the core.

In certain embodiments, the core may be a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU). In some embodiments, the electrically conductive path may be a coil form selected from the group consisting of a tilted coil, a crossed tilted coil, a tri-axial tilted coil, a helical coil and combinations thereof. In particular embodiments, the electrically conductive path may be formed on the core by coating the core with a conductive material and performing a removal process selected from the group consisting of milling, machining, etching and laser removal. In other embodiments, the electrically conductive path may be formed on the core by an additive process selected from the group consisting of printing with conductive and dielectric inks and silk screening with conductive and dielectric epoxies. In further embodiments, the electrically conductive path may be formed on the core by an integrated material deposition process such as a multi-material 3D printing process.

In a second aspect, the present disclosure is directed to a well logging tool. The well logging tool includes a tubular member having at least one antenna assembly positioned thereon and electrical circuitry operably coupled to the at least one antenna assembly. The antenna assembly includes a flexible, non-conductive cylindrical core having an outer surface and an electrically conductive path positioned on the outer surface of the core. The electrically conductive path forms an electromagnetic coil operable to transmit or receive electromagnetic energy. The electrically conductive path is formed on the core without winding a wire around the core.

In a third aspect, the present disclosure is directed to a well logging tool. The well logging tool includes a tubular member and at least one antenna assembly flexibly mounted on the tubular member. The antenna assembly includes a flexible, non-conductive cylindrical core having an outer surface and an electrically conductive path positioned on the outer surface of the core. The electrically conductive path includes an electromagnetic coil operable to transmit or receive electromagnetic energy. Electrical circuitry is electrically coupled to the at least one antenna assembly to provide electric current to or receive electric current from the electromagnetic coil.

In a fourth aspect, the present disclosure is directed to a method of producing an antenna assembly. The method includes providing a flexible, non-conductive cylindrical core having an outer surface and forming an electromagnetic coil operable to transmit or receive electromagnetic energy on the outer surface of the core by disposing an electrically conductive path on the core without winding a wire around the core.

The method may also include providing a polymer core; providing a thermoplastic core selected from the group consisting of polyphenylene sulfide (PPS), polyetherketoneketone (PEKK), polyetheretherketone (PEEK), polyetherketone (PEK), polytetrafluorethylene (PTFE) and polysulphone (PSU); coating the core with a conductive material and performing a removal process selected from the group consisting of milling, machining, etching and laser removal; performing an additive process selected from the group consisting of printing with conductive and dielectric inks and silk screening with conductive and dielectric epoxies, performing an integrated material deposition process such as a multi-material 3D printing process and/or flexible mounting the antenna assembly on a tubular member.

Referring initially to FIG. 1, a well system 10 is schematically illustrated during a drilling operation. A drilling platform 12 is equipped with a derrick 14 and a hoist 16 that supports a plurality of drill pipes connected together to form a drill string 18. Hoist 16 suspends a top drive 20 that is used to rotate drill string 18 and to lower drill string 18 through a wellhead 22. Connected to the lower end of drill string 18 is a drill bit 24. In the illustrated embodiment, drilling is accomplished by rotating drill bit 24 with drill string 18 to form wellbore 26. Drilling fluid is pumped by mud recirculation equipment 28 through supply pipe 30 to top drive 20 and down through drill string 18. The drilling fluid exits drill string 18 through nozzles in drill bit 24, cooling drill bit 24 and then carry drilling cuttings to the surface via an annulus 32 between the exterior of drill string 18 and wellbore 26. The drilling fluid then returns to a mud pit 34 for recirculation.

As illustrated, well system 10 includes a LWD system. The LWD system may include a variety of downhole components such as a well logging tool 36 that may include one or more antenna assemblies having a flexible, non-conductive cylindrical core with at least one tilted electromagnetic coil operable to transmit and/or receive electromagnetic energy enabling collection of data regarding formation properties, drilling parameters or other downhole data. In the illustrated embodiment, well logging tool 36 is coupled to mud pulse telemetry tool 38 operable to transmit data to the surface. For example, mud pulse telemetry tool 38 modulates a resistance to drilling fluid flow to generate pressure pulses that propagate at the speed of sound to the surface. One or more pressure transducers 40, 42 convert the pressure signals into electrical signals for a signal digitizer 44. A dampener or desurger 46 may be used to reduce noise from the mud recirculation equipment. Feed pipe 30 connects to a drilling fluid chamber 48 in desurger 46. A diaphragm or separation membrane 50 separates drilling fluid chamber 48 from a gas chamber 52. Diaphragm 50 moves with variations in the drilling fluid pressure, enabling gas chamber 52 to expand and contract, thereby absorbing a portion of the pressure fluctuations.

In the illustrated embodiment, digitizer 44 supplies a digital form of the pressure signals to a control subsystem such as a computer 54 via a wired or wireless communications protocol. Computer 54 may include various blocks, modules, elements, components, methods or algorithms, that can be implemented using computer hardware, software, combinations thereof and the like. The computer hardware can include a processor configured to execute one or more sequences of instructions, programming stances or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network or any like suitable entity that can perform calculations or other manipulations of data. A machine-readable medium can take on many forms including, for example, non-volatile media, volatile media and transmission media. Non-volatile media can include, for example, optical and magnetic disks 56. Volatile media can include, for example, dynamic memory. Transmission media can include, for example, coaxial cables, wire, fiber optics and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM. Alternatively, some or all of the control systems may be located remote from computer 54 and may be communicated therewith via a wired or wireless communications protocol. Data processed by computer 54 may be presented to an operator via a computer monitor 58 and may be manipulated by the operator using one or more input devices 60. In one example, the LWD system may be used to obtain and monitor the position and orientation of the bottom hole assembly, drilling parameters and formation properties.

Even though FIG. 1 depicts the present system in a vertical wellbore, it should be understood by those skilled in the art that the present system is equally well suited for use in wellbores having other orientations including horizontal wellbores, deviated wellbores, slanted wellbores or the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well, the downhole direction being toward the toe of the well. Also, even though FIG. 1 depicts an onshore operation, it should be understood by those skilled in the art that the present system is equally well suited for use in offshore operations.

Figure 2:
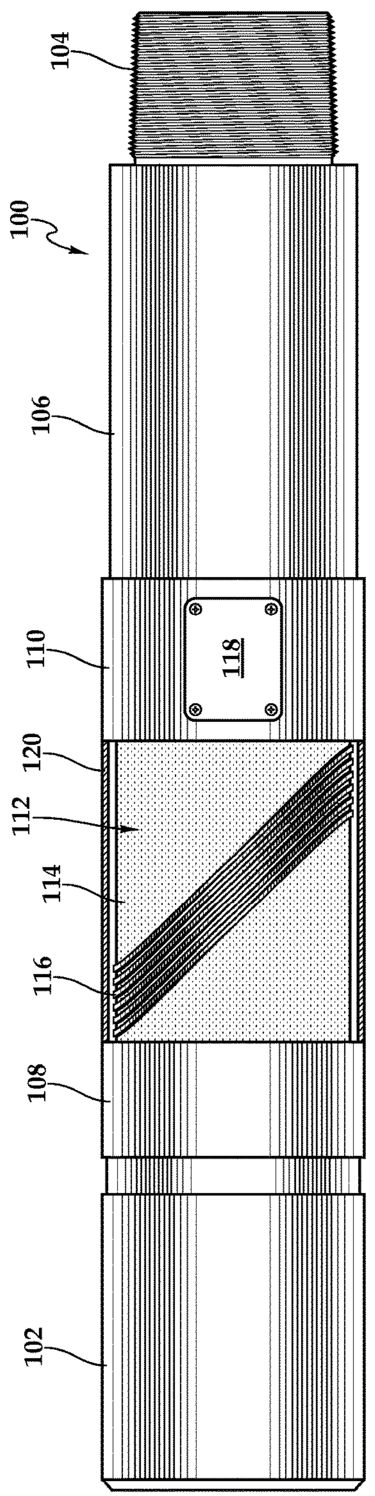
FIG. 2 is a side view of a well logging tool having a flexible antenna assembly according to an embodiment of the present disclosure.

Referring next to FIG. 2, a wellbore tubular 100 includes a flexible antenna assembly. Wellbore tubular 100 may form a portion of a well logging tool or system such as an azimuthally sensitive resistivity tool that enables the detection of distance and direction to nearby bed boundaries or other changes in resistivity in the near wellbore environment. Wellbore tubular 100 includes box end 102 and pin end 104 for enabling wellbore tubular 100 to be threadably connected to similar wellbore tubulars or other tools within a pipe string such as drill string 18 discussed above. Wellbore tubular 100 has a generally cylindrical body 106 that may be formed from a metal such as steel. In the illustrated embodiment, wellbore tubular 100 includes a pair of collars 108, 110 that may be coupled to wellbore tubular 100 by threading, welding, set screws or other suitable means.

Positioned between collars 108, 110 on the exterior of wellbore tubular 100 is a flexible antenna assembly 112. Collars 108, 110 and flexible antenna assembly 112 may be assembled as a unit prior to being positioned on wellbore tubular 100 or may be positioned as individual elements on wellbore tubular 100. Flexible antenna assembly 112 includes a flexible, non-conductive cylindrical core 114 having an electrically conductive path depicted as an electromagnetic coil 116 positioned exteriorly thereof. Flexible, non-conductive cylindrical core 114 may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU). Preferably, the material of flexible, non-conductive cylindrical core 114 has suitable deformability, moldability, bendability and/or flexibility such that flexible antenna assembly 112 may be elastically or pliably deformed, molded, bended or flexed to aid in the process of installing flexible antenna assembly 112 exteriorly on or around wellbore tubular 100 by, for example, sliding flexible antenna assembly 112 over at least a portion of the length of wellbore tubular 100 including potentially radially expanded portions thereof. The installation process may be referred to as flexibly mounting flexible antenna assembly 112 on wellbore tubular 100.

In the illustrated embodiment, electromagnetic coil 116 has a tilted coil form including a plurality of elliptical turns and at least two leads (not visible) that are connected to electrical circuitry (not visible). The electrical circuitry is of the type known to those skilled in the art that is operable to provide or supply electric current to electromagnetic coil 116 such that electromagnetic coil 116 generates electromagnetic signals and/or receive electric current from electromagnetic coil 116 when electromagnetic coil 116 receives electromagnetic signals. The electrical circuitry may be contained in, for example, a hermetically sealed cavity behind access panel 118 of collar 110. Alternatively or additionally, electrical circuitry may be positioned within a cavity of wellbore tubular 100 or may be located in another tool that is positioned proximate to wellbore tubular 100 in the tool string. Regardless of location, the electrical circuitry may, for example, process received signals to measure attenuation and phase shift, or alternatively, may digitize and timestamp signals and communicate signals to other components of the logging tool or logging system. In operation, when an alternating current is applied to electromagnetic coil 116 by the electrical circuitry, an electromagnetic field is produced. Conversely, an alternating electromagnetic field in the vicinity of electromagnetic coil 116 induces a voltage at the leads causing an alternating current to flow from electromagnetic coil 116 to the electrical circuitry. Thus, flexible antenna assembly 112 may be used to transmit or receive electromagnetic waves. A sleeve or other protective cover 120, shown in cross section and formed of conductive material, non-conductive material or a combination thereof, such as a non-magnetic steel, may be positioned over flexible antenna assembly 112. Sleeve 120 may be solid or may have perforations therethrough that may generally correspond with the position of electromagnetic coil 116 thereunder.

Figure 3:
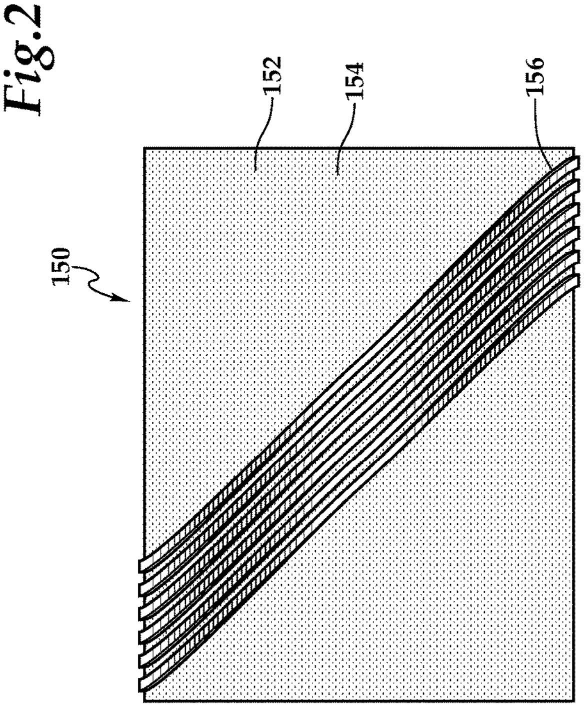
FIG. 3 is a side view of a flexible antenna assembly according to an embodiment of the present disclosure.

Referring next to FIG. 3, a flexible antenna assembly 150 includes a flexible, non-conductive cylindrical core 152 having an outer surface 154. Flexible, non-conductive cylindrical core 152 may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU). An electrically conductive path depicted as an electromagnetic coil 156 having a tilted coil form is positioned on outer surface 154 of core 152. As described below, the electrically conductive path is formed on core 152 without winding a wire around core 152. In operation, electromagnetic coil 156 is operable to transmit or receive electromagnetic energy. Electromagnetic coil 156 includes at least two leads (not visible) that may be connected to electrical circuitry of a well logging tool, as discussed above. As illustrated, electromagnetic coil 156 includes six elliptical turns around core 152 having a tilt angle of approximately 45 degrees. It should be understood by those skilled in the art, that even though electromagnetic coil 156 has been described and depicted as having a particular number of turns in FIG. 3, a flexible antenna assembly of the present disclosure may have any number of turns both greater than or less than the number shown. In addition, even though electromagnetic coil 156 has been described and depicted as having a particular tilt angle in FIG. 3, a flexible antenna assembly of the present disclosure may have a different tilt angle, which may be greater than or less than the angle shown.

Figure 4:
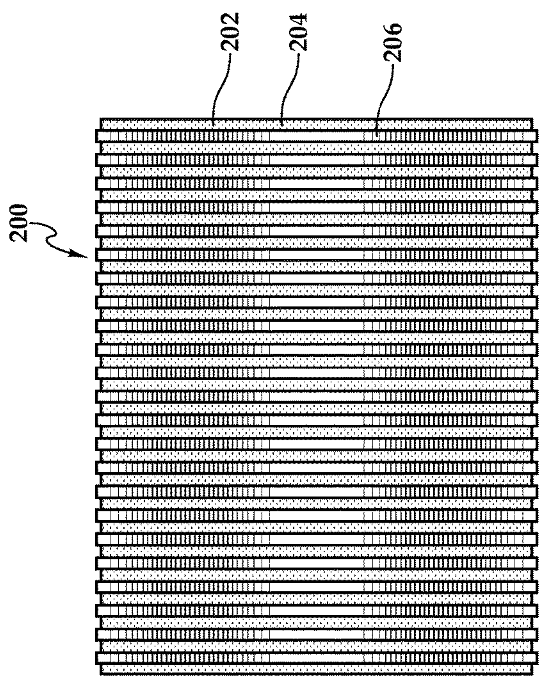
FIG. 4 is a side view of a flexible antenna assembly according to an embodiment of the present disclosure.

For example, referring next to FIG. 4, a flexible antenna assembly 200 includes a flexible, non-conductive cylindrical core 202 having an outer surface 204. Flexible, non-conductive cylindrical core 202 may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU). An electrically conductive path depicted as an electromagnetic coil 206 having a helical coil form is positioned on outer surface 204 of core 202. As described below, the electrically conductive path is formed on core 202 without winding a wire around core 202. In operation, electromagnetic coil 206 is operable to transmit or receive electromagnetic energy. Electromagnetic coil 206 includes at least two leads (not visible) that may be connected to electrical circuitry of a well logging tool, as discussed above.

Figure 5:
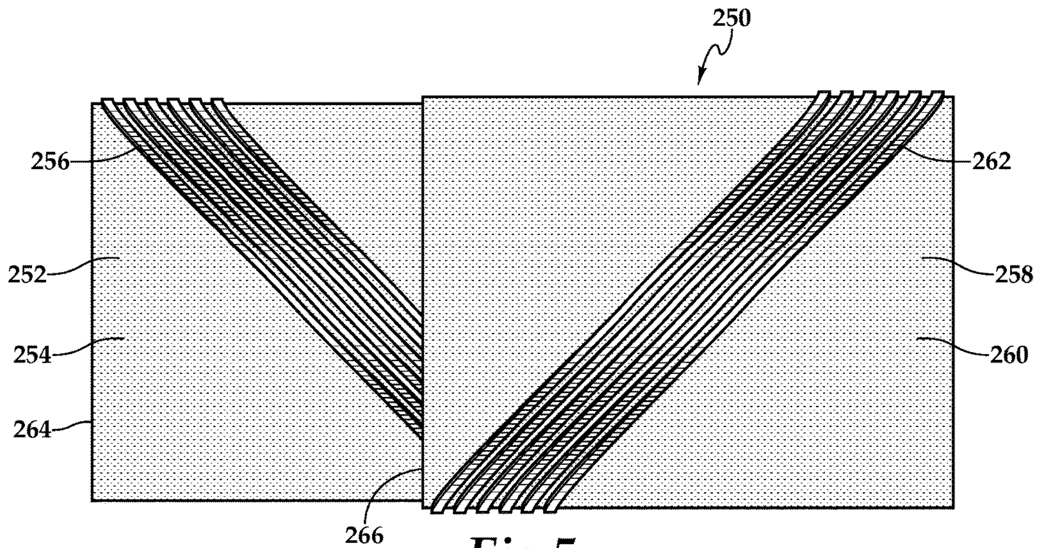
FIG. 5 is a partially exploded side view of a flexible antenna assembly according to an embodiment of the present disclosure.

Even though the flexible antenna assemblies of FIGS. 3 and 4 have been described and depicted as having a single electromagnetic coil, a flexible antenna assembly of the present disclosure may have multiple electromagnetic coils that operate independent of one another or that cooperate with one another. For example, FIG. 5 depicts a flexible antenna assembly 250 including two electromagnetic coils. Flexible antenna assembly 250 includes a flexible, non-conductive cylindrical core 252 having an outer surface 254.

An electrically conductive path depicted as an electromagnetic coil 256 having a tilted coil form is positioned on outer surface 254 of core 252. In addition, flexible antenna assembly 250 includes a non-conductive layer 258 having an outer surface 260. Non-conductive layer 258 may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU). An electrically conductive path depicted as an electromagnetic coil 262 having a tilted coil form is positioned on outer surface 260 of layer 258. FIG. 5 illustrates flexible antenna assembly 250 in a partially exploded view to aid in visualization of the various layers. In practice, edge 264 of core 252 would preferably be aligned with edge 266 of layer 258, such that electromagnetic coils 256, 262 are configured in a crossed tilted coil form wherein, in the illustrated embodiment, electromagnetic coils 256, 262 are rotated 180 degrees relative to one another. As described below, the electrically conductive paths are formed on core 252 and layer 258 without winding wires therearound. In operation, each of electromagnetic coils 256, 262 is operable to transmit or receive electromagnetic energy. Each of electromagnetic coils 256, 262 includes at least two leads (not visible) that may be connected to electrical circuitry of a well logging tool, as discussed above.

Figure 6:
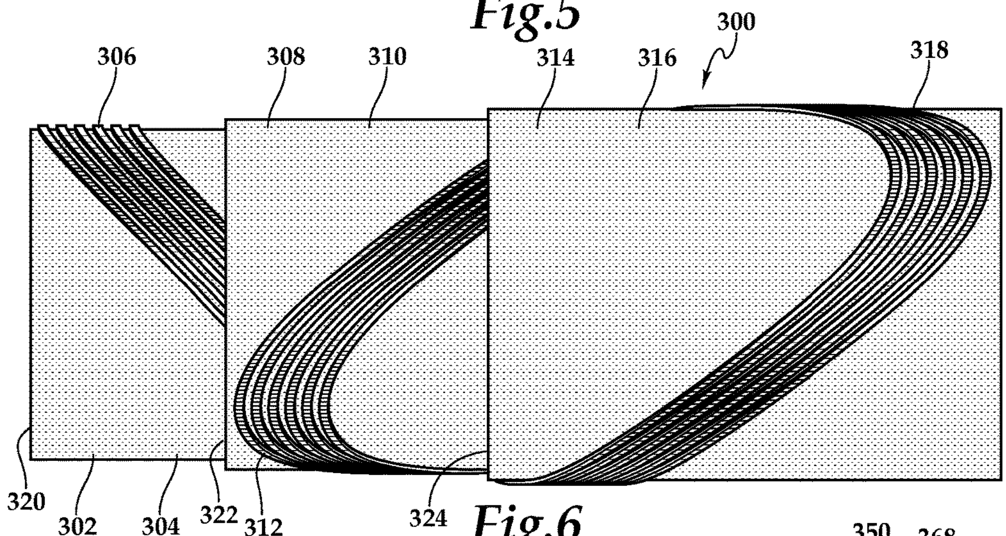
FIG. 6 is a partially exploded side view of a flexible antenna assembly according to an embodiment of the present disclosure.

In another example, FIG. 6 depicts a flexible antenna assembly 300 including three electromagnetic coils. Flexible antenna assembly 300 includes a flexible, non-conductive cylindrical core 302 having an outer surface 304. An electrically conductive path depicted as an electromagnetic coil 306 having a tilted coil form is positioned on outer surface 304 of core 302. In addition, flexible antenna assembly 300 includes a non-conductive layer 308 having an outer surface 310. An electrically conductive path depicted as an electromagnetic coil 312 having a tilted coil form is positioned on outer surface 310 of layer 308. Flexible antenna assembly 300 includes a second non-conductive layer 314 having an outer surface 316. An electrically conductive path depicted as an electromagnetic coil 318 having a tilted coil form is positioned on outer surface 316 of layer 314. FIG. 6 illustrates flexible antenna assembly 300 in a partially exploded view to aid in visualization of the various layers. In practice, edge 320 of core 302 would preferably be aligned with edge 322 of layer 308 and edge 324 of layer 314, such that electromagnetic coils 306, 312, 318 are configured in a tri-axial tilted coil form wherein, in the illustrated embodiment, each electromagnetic coil 306, 312, 318 is rotated 120 degrees relative to its circumferentially adjacent electromagnetic coils 306, 312, 318. As described below, the electrically conductive paths are formed on core 302 and layers 308, 314 without winding wires therearound. In operation, each of electromagnetic coils 306, 312, 318 is operable to transmit or receive electromagnetic energy. Each of electromagnetic coils 306, 312, 318 includes at least two leads (not visible) that may be connected to electrical circuitry of a well logging tool, as discussed above.

Figure 7:
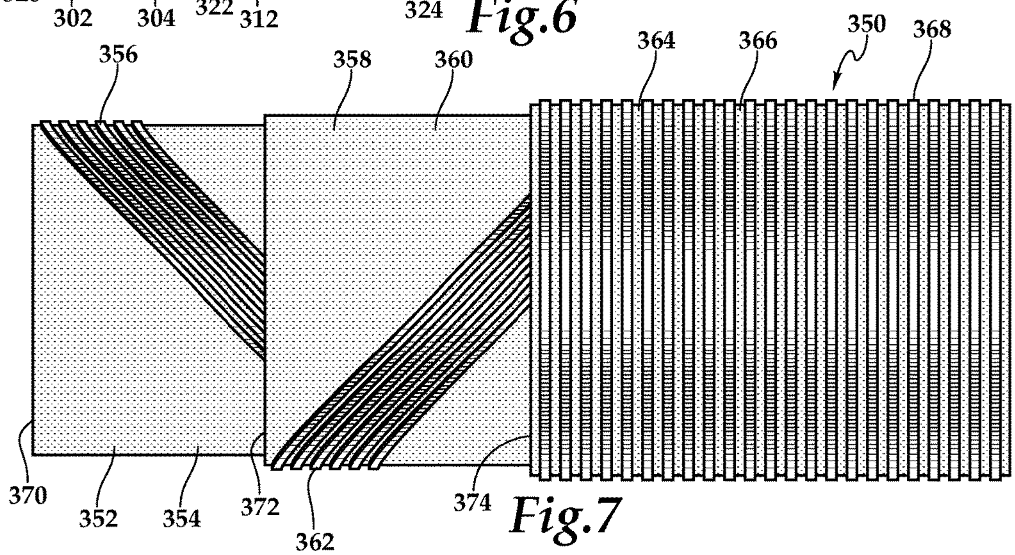
FIG. 7 is a partially exploded side view of a flexible antenna assembly according to an embodiment of the present disclosure.

In a further example, FIG. 7 depicts a flexible antenna assembly 350 including three electromagnetic coils. Flexible antenna assembly 350 includes a flexible, non-conductive cylindrical core 352 having an outer surface 354. An electrically conductive path depicted as an electromagnetic coil 356 having a tilted coil form is positioned on outer surface 354 of core 352. In addition, flexible antenna assembly 350 includes a non-conductive layer 358 having an outer surface 360. An electrically conductive path depicted as an electromagnetic coil 362 having a tilted coil form is positioned on outer surface 360 of layer 358. Flexible antenna assembly 350 includes a second non-conductive layer 364 having an outer surface 366. An electrically conductive path depicted as an electromagnetic coil 368 having a helical coil form is positioned on outer surface 366 of layer 364. FIG. 6 illustrates flexible antenna assembly 350 in a partially exploded view to aid in visualization of the various layers. In practice, edge 370 of core 352 would preferably be aligned with edge 372 of layer 358 and edge 374 of layer 364, such that electromagnetic coils 356, 362, 388 are configured in a cross tilted and helical coil form wherein, in the illustrated embodiment, electromagnetic coils 356, 362 are rotated 180 degrees relative to one another with electromagnetic coil 368 positioned therearound. As described below, the electrically conductive paths are formed on core 352 and layers 358, 364 without winding wires therearound. In operation, each of electromagnetic coils 356, 362, 388 is operable to transmit or receive electromagnetic energy. Each of electromagnetic coils 356, 362, 388 includes at least two leads (not visible) that may be connected to electrical circuitry of a well logging tool, as discussed above.

Figure 8:
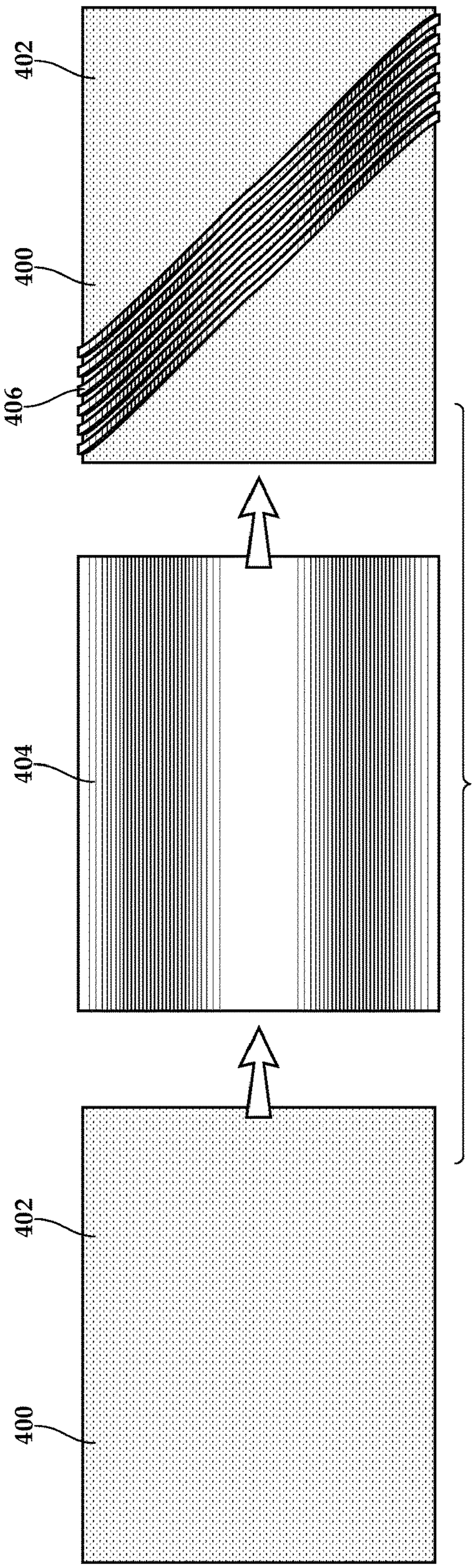
FIG. 8 depicts process steps for forming a flexible antenna assembly according to an embodiment of the present disclosure.

Process steps for forming a flexible antenna assembly will now be discussed with reference to FIG. 8. In the illustrated process, the first step is providing a flexible, non-conductive cylindrical core 400 that may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU) or other suitably flexible and non-conductive material using an extrusion process or other suitable process. The outer surface 402 of flexible, non-conductive cylindrical core 400 is then coated with a conductive material layer 404, for example a metal layer such as a copper layer, using a dipping process, a spraying process or other suitable process. An interface layer may be disposed between outer surface 402 and conductive material layer 404 if desired. As illustrated, the entire outer surface 402 may be coated. Alternatively, only a portion of the outer surface 402 may be coated. The excess portion of conductive material layer 404 is then removed from outer surface 402 using a removal process such as milling, machining, etching, laser removal or other suitable removal process to form an electrically conductive path depicted as an electromagnetic coil 406 having a tilted coil form. As such, the electrically conductive path is formed on core 400 without winding a wire around core 400.

This process may be used to form more complicated antenna assemblies such as those having crossed tilted coil forms or tri-axial tilted coil forms. For example, once the removal process is complete, a nonconductive material layer may be applied over outer surface 402 and electromagnetic coil 406, using a dipping process, a spraying process or other suitable process. Thereafter, another conductive material layer may be applied to the outer surface of the nonconductive material layer and then a removal process may be used to form the desired electrically conductive path on the outer surface of the nonconductive material layer. The process may be repeated as required to create a flexible antenna assembly having any number of desired layers. Alternatively, each layer of a flexible antenna assembly may be independently formed using the above process then one layer may be inserted into another layer in a manner that could be represented by FIG. 5 wherein core 252 and electromagnetic coil 256 are depicted as being partially inserted into layer 258 an electromagnetic coil 262 prior to aligning edges 264, 266.

Figure 9:
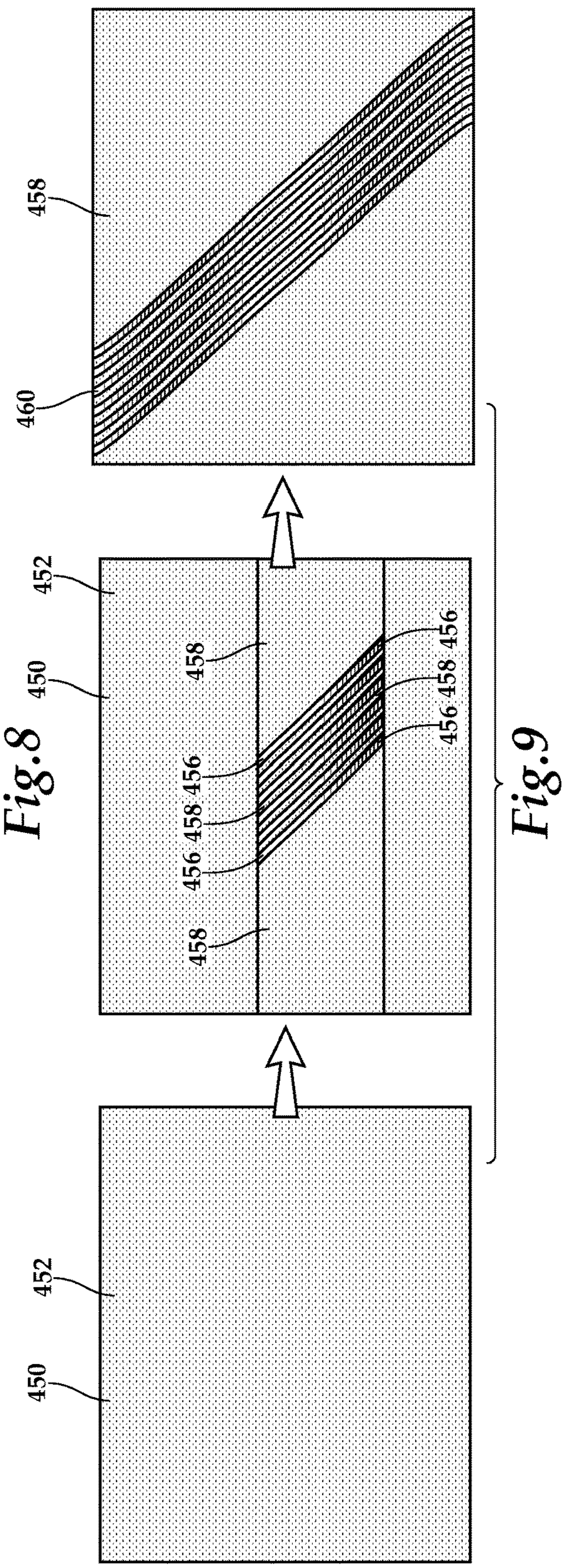
FIG. 9 depicts process steps for forming a flexible antenna assembly according to an embodiment of the present disclosure.

Alternate process steps for forming a flexible antenna assembly will now be discussed with reference to FIG. 9. In the illustrated process, the first step is providing a flexible, non-conductive cylindrical core 450 that may be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU) or other suitably flexible and non-conductive material. An additive process such as printing with conductive and dielectric inks, silk screening with conductive and dielectric epoxies or other suitable multi-material or similar additive process may be used to apply a layer of material that includes conductive portions 456 and nonconductive portions 458 to outer surface 452 of flexible, non-conductive cylindrical core 450. For example, the layer of conductive and nonconductive materials may be applied in multiple passes as core 450 is rotationally indexed. As illustrated, the layer of conductive and nonconductive materials may coat the entire width of outer surface 452. Alternatively, the layer of conductive and nonconductive materials may coat only a portion of the width of outer surface 452. Once core 450 has been rotated through 360 degrees, the process results in an electrically conductive path depicted as an electromagnetic coil 460 having a tilted coil form. As such, the electrically conductive path is formed on core 450 without winding a wire around core 450. This process may be used to form more complicated antenna assemblies such as those having crossed tilted coil forms or tri-axial tilted coil forms. For example, once the first additive process is complete, a second additive process may be performed to place a second layer of material that includes conductive portions and nonconductive portions to the outer surface of the prior additive material layer. The second additive process may be used to form the desired electrically conductive path on the outer surface of the prior additive material layer. The process may be repeated as required to create a flexible antenna assembly having any number of desired layers.

Figure 10:
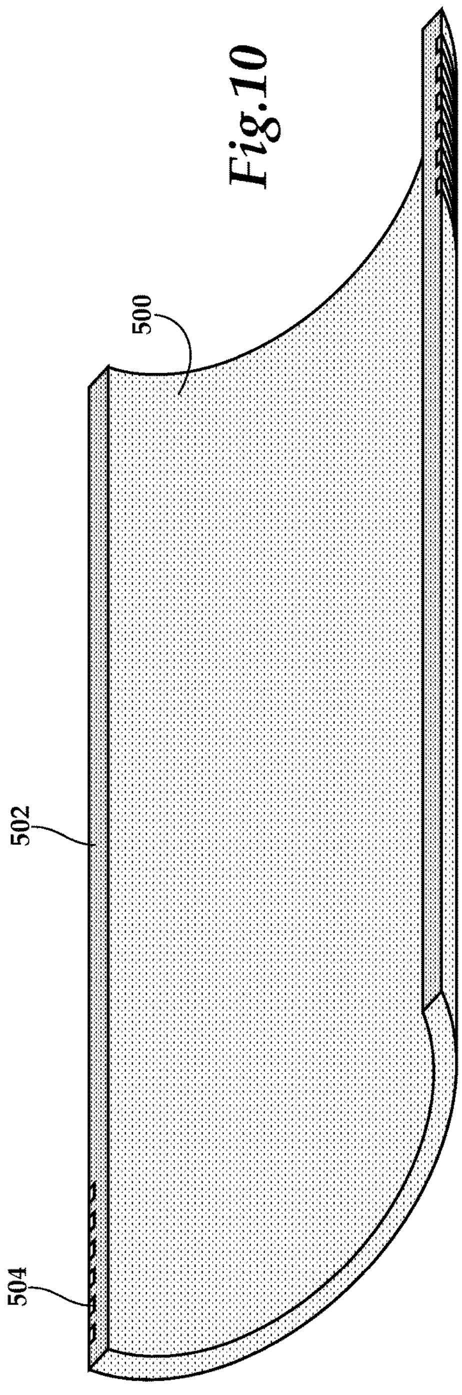
FIG. 10 depicts a partially formed flexible antenna assembly during a 3D printing operation according to an embodiment of the present disclosure.

In FIG. 10, a flexible antenna assembly 500 is being manufactured using an integrated material deposition process such as a multi-material 3D printing process. This process is an additive manufacturing process used to make three-dimensional solid objects from a digital model. In this example, flexible antenna assembly 500 is printed by placing successive layers of material one on top of the next. As flexible antenna assembly 500 requires two materials, a non-conductive material to form the flexible, non-conductive cylindrical core 502 and a conductive material to form the electromagnetic coil 504, the 3D printing process is a multi-material process. For example, flexible, non-conductive cylindrical core 400 may be preferably be formed from a polymer, polymer alloy or copolymer including thermoplastics such as polyphenylene sulfide (PPS), polyetherketoneketone (PEKK), polyetheretherketone (PEEK), polyetherketone (PEK), polytetrafluorethylene (PTFE) and polysulphone (PSU) or other suitably flexible and non-conductive material while electromagnetic coil 504 may be preferably be formed from a metal such as copper. Applying the multi-material layers may be achieved using any known or later discovered 3D printing technique so long as the process forms a suitable electrically conductive path in the form of an electromagnetic coil 504, which is only partially formed in FIG. 10. As such, the electrically conductive path may be formed on core 500 without winding a wire around core 500.

Figure 11:
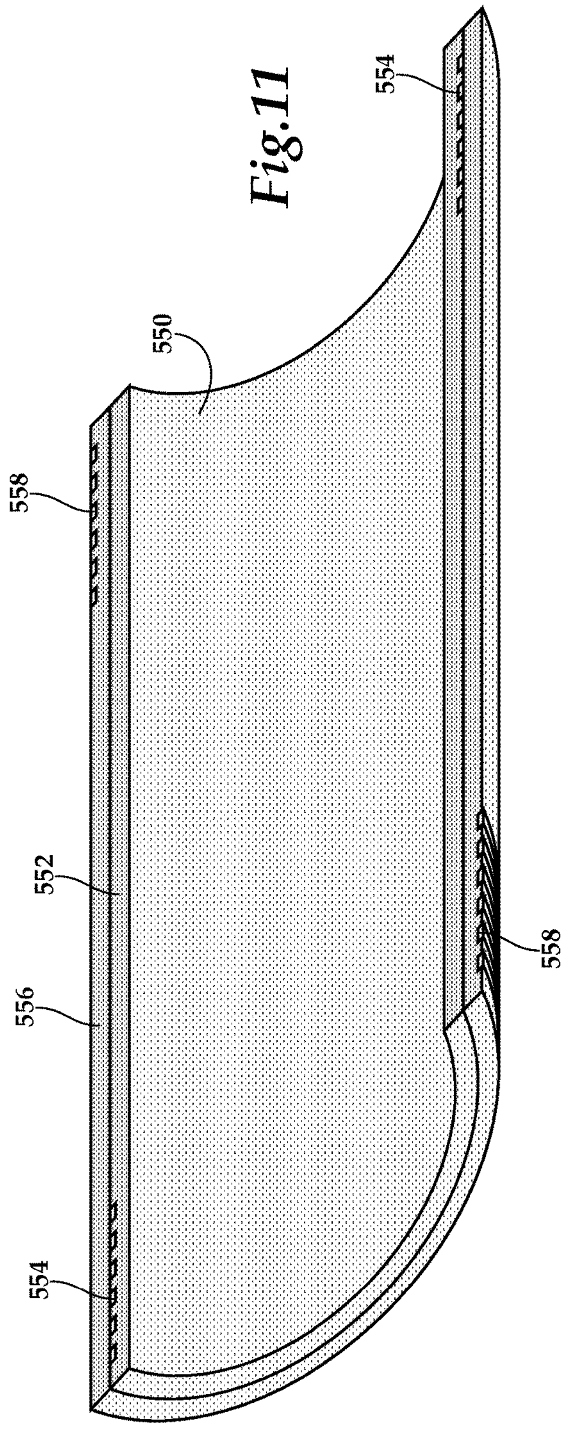
FIG. 11 depicts a partially formed flexible antenna assembly during a 3D printing operation according to an embodiment of the present disclosure.

This process may be used to form more complicated antenna assemblies such as those having crossed tilted coil forms or tri-axial tilted coil forms. For example, as best seen in FIG. 11, a flexible antenna assembly 550 is being manufactured using an integrated material deposition process such as a multi-material 3D printing process. In this example, flexible antenna assembly 550 is printed by placing successive layers of material one on top of the next. As illustrated, flexible antenna assembly 550 has a flexible, non-conductive cylindrical core 552, an electromagnetic coil 554, a non-conductive layer 556 and an electromagnetic coil 558, all of which may be formed in layers using the multi-material 3D printing process.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed is:

1. A well logging tool comprising:
- a tubular member;
- at least one antenna assembly flexibly mounted on the tubular member, the antenna assembly including:
  - a flexible, non-conductive cylindrical core having a first outer surface and a first electrically conductive path positioned on the first outer surface of the core, the first electrically conductive path including a first electromagnetic coil operable to transmit or receive electromagnetic energy; and
  - a non-conductive layer positioned over the core and the first electromagnetic coil, the non-conductive layer having a second outer surface and a second electrically conductive path positioned on the second outer surface, the second electrically conductive path including a second electromagnetic coil operable to transmit or receive electromagnetic energy;
  - wherein the flexible, non-conductive cylindrical core, the first electrically conductive path, the non-conductive layer, and the second electrically conductive path are formed using a multi-material 3D printing process; and
- electrical circuitry electrically coupled to the at least one antenna assembly to provide electric current to or receive electric current from the first electromagnetic coil and the second electromagnetic coil.

2. The well logging tool as recited in claim 1 wherein the core further comprises a polymer.

3. The well logging tool as recited in claim 1 wherein the core further comprises a thermoplastic selected from the group consisting of polyphenylene sulfide (PPS), polyetherketoneketone (PEKK), polyetheretherketone (PEEK), polyetherketone (PEK), polytetrafluorethylene (PTFE) and polysulphone (PSU).

4. The well logging tool as recited in claim 1 wherein the first electrically conductive path further comprises a coil form selected from the group consisting of a tilted coil, a crossed tilted coil, a tri-axial tilted coil, a helical coil and combinations thereof.

5. The well logging tool as recited in claim 1 wherein the first electrically conductive path is formed on the core by coating the core with a conductive material and performing a removal process selected from the group consisting of milling, machining, etching and laser removal.

6. The well logging tool as recited in claim 5 wherein coating the core with the conductive material further comprises a process selected from the group consisting of spraying and dipping.

7. The well logging tool as recited in claim 1 wherein the first electrically conductive path and the second electrically conductive path are formed by the multi-material 3D printing process as coils.

8. The well logging tool as recited in claim 7 wherein the the multi-material 3D printing process is an integrated material deposition process.

9. The well logging tool as recited in claim 1 wherein the multi-material 3D printing process is used to print the non-conductive layer as a cylindrical layer.

10. A method of producing an antenna assembly comprising:

forming a flexible, non-conductive cylindrical core having a first outer surface as part of a multi-material 3D printing process;

forming a first electromagnetic coil operable to transmit or receive electromagnetic energy on the first outer surface of the core by disposing a first electrically conductive path on the core as part of the multi-material 3D printing process;

forming a non-conductive layer positioned over the core and the first electromagnetic coil as part of the multi-material 3D printing process, the non-conductive layer having a second outer surface;

forming a second electromagnetic coil operable to transmit or receive the electromagnetic energy on the second outer surface by disposing a second electrically conductive path on the non-conductive layer as part of the multi-material 3D printing process.

11. The method as recited in claim 10 wherein providing forming the flexible, non-conductive cylindrical core further comprises forming a polymer core.

12. The method as recited in claim 10 wherein forming the flexible, non-conductive cylindrical core further comprises forming a thermoplastic core selected from the group consisting of polyphenylene sulfide (PPS), polyetherketoneketone (PEKK), polyetheretherketone (PEEK), polyetherketone (PEK), polytetrafluorethylene (PTFE) and polysulphone (PSU).

13. The method as recited in claim 10 wherein disposing the first electrically conductive path on the core further comprises coating the core with a conductive material and performing a removal process selected from the group consisting of milling, machining, etching and laser removal.

14. The method as recited in claim 13 wherein coating the core with the conductive material further comprises a process selected from the group consisting of spraying and dipping.

15. The method as recited in claim 10 wherein disposing the first electrically conductive path on the core and disposing the second electrically conductive path on the non-conductive layer further comprises printing the first electrically conductive path and the second electrically conductive path as coils.

16. The method as recited in claim 10 wherein the multi-material 3D printing process is an integrated material deposition process.

17. The method as recited in claim 16 wherein forming the non-conductive layer further comprises printing the non-conductive layer as a cylindrical layer.

18. The method as recited in claim 10 further comprising flexibly mounting the antenna assembly on a tubular member.

* * * * *